Oct. 8, 1957  A. DUSABLON ET AL  2,808,677

FISH LURE

Filed June 28, 1954

*INVENTORS*
ARTHUR DUSABLON
JOSEPH P. CARR
BY

*Barlow & Barlow*
ATTORNEYS

United States Patent Office 2,808,677
Patented Oct. 8, 1957

2,808,677

FISH LURE

Arthur Dusablon and Joseph P. Carr, North Attleboro, Mass., assignors to Evans Case Co., a corporation of Massachusetts Application June 28, 1954, Serial No. 439,782

1 Claim. (Cl. 43—42.22)

This invention relates to an improved fish lure, particularly a trolling fish lure.

It is desirable in a fishing lure of the above character that it be able to be trolled at varying depths through the water and additionally that it wobble through the water in novel manners. For some particular types of fish the fisherman may desire a certain action at a certain depth, while for other types of fish the lure must of necessity be adjusted for a different action and perhaps a different depth.

It is therefore an object of this invention to provide an improved fishing lure having a plate mounted at the forward end thereof and means for adjusting the plate so that the lure may have varying degrees of wobbling motion at the will of the fisherman.

Another object of the invention is to provide a trolling lure so constructed that its bouyancy may be varied to control the depth at which the lure will be drawn through the water.

A still further object of the invention is to provide a buoyant hollow trolling lure having a plate mounted on the front end thereof with means for adjusting the buoyancy of the lure as well as the wobbling motions.

With these and other objects in view, the invention consists of certain novel features of construction as will be more fully described and particularly pointed out in the appended claim.

Figure 1:
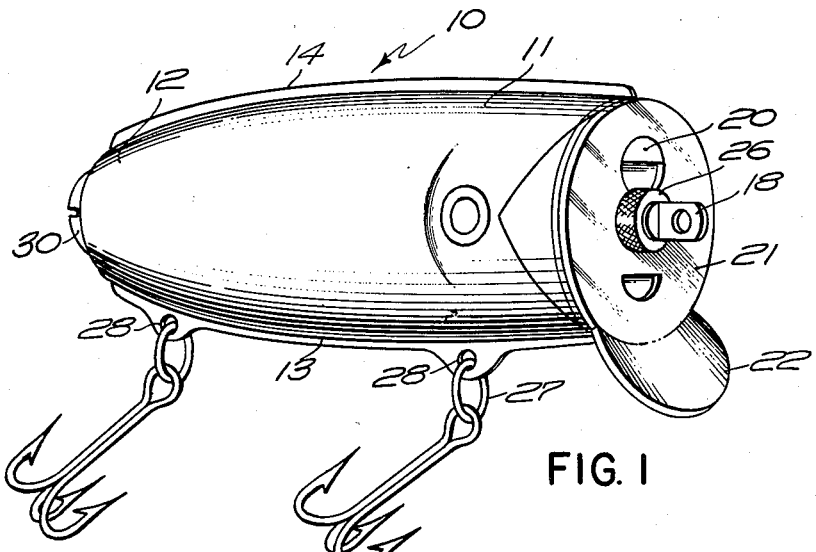
Figure 1 is a perspective view of a fish lure embodying the features of our invention.

Referring to the drawings, numeral 10 generally designates our improved fishing lure which may be used as a lure that will wobble under the water when the front plate is adjusted to a certain position or may be transformed into a popping surface lure in other adjusted positions of the plate. The lure 10 is formed of a sheet metal plug body 11 which is made generally cylindrical in shape and which may have a tapered tail portion 12, the sides of which converge rearwardly of the body. The body may be preferably made of two similar half sections, each of which is provided with flanges 13, 14 extending radially outwardly and longitudinally from end to end of the half sections. These half sections are positioned in registry with each other, and the flanges 13 and 14 are secured to each other such as by solder or any other convenient connection whereby a sealed joint may be had between the two halves. The plug body 11 may also be formed from other material such as wood or plastic. The front end of the plug is sealed by means of a flat plate 15 that is suitably secured to the asembled half sections and is provided with an opening 16 through the center thereof. A threaded nut 17 is secured on the inward side of the plate 15 and is adapted to receive a threaded line post 18 having a hole 19 for the attachement of a fishing line. A semi-circular positioning plug 20 is soldered to the base plate 15 on a radius thereof that is adapted to position a removable front plate 21 that will presently be described.

The front plate 21 is provided with a generally flat surface of circular form, the diameter of which is substantially that of the flat plate 15 and has extending from the circumference thereof over an arc of approximately 90 degrees a concave section, the plane of which generally intersects the flat plate 21 at an obtuse angle. The front plate 21 is additionally provided with two openings 23, 24, the opening 24 being circular and having a slot 25 extending radially therefrom to form a bayonet opening. The opening 23 is semi-circular in shape, and both openings are adapted to register with the semi-circular plug 20 affixed to the front plate. The plate 21 is therefore placed in assembly with the flat plate 15 by slipping the bayonet opening over the line post nut 26 and sliding the plate 21 so that the slot 25 registers with the line post 18. The front plate 21 will be fixedly attached to the fish lure body by means of a lock nut 26 that engages the threaded portion of the line post 18 and may be jammed down upon the front plate 21. Fish hooks are preferably fastened to the flange 13 by means of a split ring 27 of the socalled key ring type whereby the hooks, which may be of the multiple type, may be readily attached and detached from the openings 28 in the flange 13. Other forms of attachment for the hooks may be utilized as is well known in the art.

Figure 2:
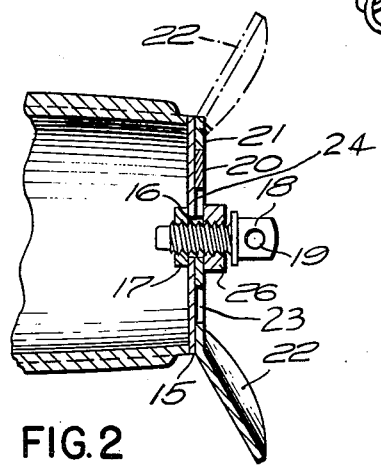
Figure 2 is a partial longitudinal section of the lure showing the construction at the front end thereof.
Figure 3:
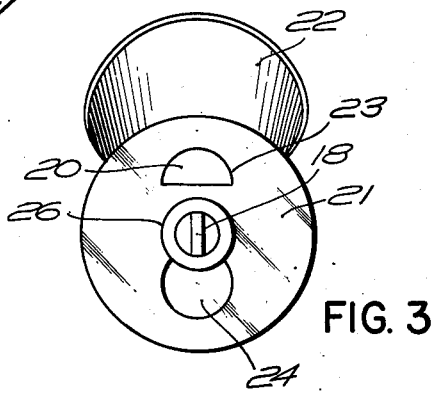
Figure 3 is a front view of the fish lure.
Figure 4:
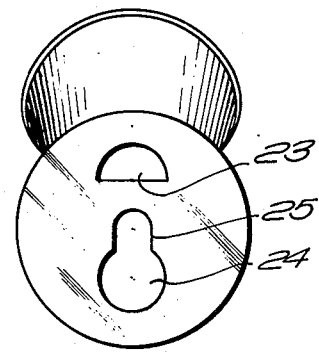
Figure 4 is a plan view of the adjustable plate mounted on the front end of the lure.

In order to provide for varying the buoyancy of the fish lure, the tail end of the body 12 may be provided with a threaded opening, not shown, which is adapted to receive a threaded closure plug 30 having an enlarged head and provided with a slot that will be adapted to receive a tool such as a coin or screw driver for tightening or removing the closure. When using the lure for trolling at a depth, liquids such as water may be received through the closure 30 in a volume to weight the lure and cause the same to sink to the desired depth. It will, of course, be appreciated that a lesser quantity of water may be placed in the body 11 when it is desired to troll nearer the surface. With the front plate 21 adjusted, as shown in Figure 1, the force of the water impinging upon the convex lip 22 will direct the lure downwardly and will also create a maximum amount of wobbling action. Should it be desired to utilize the lure as a so-called pop plug, the buoyancy of the lure may be increased by removing liquid from the body thereof and the front plate 21 adjusted so that the lip extends upwardly as shown in broken lines in Figure 2. This change may be readily effected by backing off the nut 26 and rotating the front plate 21 through 180 degrees until registry of the circular opening 24 is had with the semi-circular plug 20 and the thumb nut 26 may then be tightened and the lure is then ready for use. As will be readily appreciated, with the lip 22 adjusted in the position shown in broken lines in Figure 2, the lure will tend to dart toward the surface at frequent intervals as it is being trolled, the frequency thereof being readily controlled by the buoyancy of the lure body. It will additionally be appreciated that with this construction many different lips may be used with the lure by simply interchanging them.

We claim:

A fish lure comprising an elongated plug body of generally cylindrical form and having a flat surface at one end thereof extending generally normal to the longitudinal extent of said body, a screw threaded line post extending centrally from said flat surface, said flat surface having at least one projection thereon spaced from said post, a flat plate engaging said flat surface and having a central opening through which said post extends, a lock nut engaging said post for detachably securing said plate to said flat surface, said plate having a lip projecting from the edge thereof at an obtuse angle with reference to the outer side of said plate, said plate having a second opening of a size greater than the diameter of the lock nut and which constitutes an extension of the central opening, said plate being capable of being located against the flat surface of the plug body by inserting the line post in the second opening and passing the nut through the said opening and then laterally shifting the plate so as to position the line post in the central opening, said plate having a third opening therethrough at a location diametrically opposite the said second opening, said second and third openings being adapted to receive said projection to selectively position said lip on one side or the other of said post.

References Cited in the file of this patent

UNITED STATES PATENTS

| | | |
|---|---|---|
| 1,254,397 | Dickens | Jan. 22, 1918 |
| 1,415,653 | Koepke | May 9, 1922 |
| 2,495,134 | Roberts | Jan. 17, 1950 |
| 2,578,786 | Davis | Dec. 18, 1951 |
| 2,659,176 | Wenger | Nov. 17, 1953 |
| 2,723,483 | Jepson | Nov. 15, 1955 |